United States Patent
Aykin (10) Patent No.: US 10,819,827 B1
(45) Date of Patent: Oct. 27, 2020

(54) SYSTEM FOR SERVER SCHEDULING USING INTEGER PROGRAMMING

(71) Applicant: Turgut Aykin, New Hope, PA (US)

(72) Inventor: Turgut Aykin, New Hope, PA (US)

(*) Notice: Subject to any disclaimer, the term of this patent is extended or adjusted under 35 U.S.C. 154(b) by 20 days.

(21) Appl. No.: 16/418,568

(22) Filed: May 21, 2019

Related U.S. Application Data (60) Provisional application No. 62/677,294, filed on May 29, 2018.

(51) Int. Cl.
*H04L 29/08* (2006.01)
*G06F 17/11* (2006.01)
*G06N 7/00* (2006.01)

(52) U.S. Cl.
CPC ............ *H04L 67/325* (2013.01); *G06F 17/11* (2013.01); *G06N 7/00* (2013.01)

(58) Field of Classification Search
CPC .......... H04L 67/325; G06F 17/11; G06N 7/00
See application file for complete search history.

(56) References Cited

U.S. PATENT DOCUMENTS

| | | |
|---|---|---|
| 5,216,593 A | 6/1993 | Dietrich et al. |
| 5,911,134 A | 6/1999 | Castonguay et al. |
| 6,002,863 A | 12/1999 | Sheer et al. |
| 6,044,355 A | 3/2000 | Crockett et al. |
| 6,192,122 B1 | 2/2001 | Flockhart et al. |
| 6,192,346 B1 | 2/2001 | Green |
| 6,278,978 B1 | 8/2001 | Andre et al. |
| 6,516,301 B1 | 2/2003 | Aykin |
| 6,563,920 B1 | 5/2003 | Flockhart et al. |
| 6,581,027 B1 | 6/2003 | Sheer et al. |
| 6,622,134 B1 | 9/2003 | Sorkin et al. |
| 6,744,877 B1 | 6/2004 | Edwards |
| 6,766,012 B1 | 7/2004 | Crossley |
| 6,831,966 B1 | 12/2004 | Tegan et al. |
| 6,856,680 B2 | 2/2005 | Mengshoel et al. |
| 6,970,829 B1 | 11/2005 | Leamon |
| 7,249,047 B2 | 7/2007 | Arguello et al. |
| 7,451,098 B2 | 11/2008 | Ingman et al. |
| 7,478,051 B2 | 1/2009 | Nourbakhsh et al. |
| 7,725,339 B1 | 5/2010 | Aykin |
| 7,987,106 B1 | 7/2011 | Aykin |
| 8,332,249 B1 | 12/2012 | Aykin |
| 8,577,706 B1 | 11/2013 | Aykin |
| 8,612,272 B1 | 12/2013 | Aykin |
| 2004/0054564 A1 | 3/2004 | Fonseca et al. |
| 2004/0113311 A1 | 6/2004 | Ingman et al. |
| 2006/0047553 A1* | 3/2006 | Fuhrmann .......... G06Q 10/1095 705/7.19 |
| 2006/0112049 A1 | 5/2006 | Mehrotra et al. |

(Continued)

*Primary Examiner* — El Hadji M Sall (57) ABSTRACT

A system for scheduling servers is provided. The system receives a scheduling period, staffing requirements in planning intervals during the scheduling period, skill groups with one or more servers in each skill group, location, tour group, shift templates and associated scheduling rules for each server to be scheduled. The system generates a Mixed Integer Linear Programming model using this information. The system continues searching feasible solutions to the Mixed Linear Integer Programming model until one or more stopping criteria are satisfied by a terminal solution. The system generates detailed server schedules using the terminal solution to the Mixed Integer Linear Programming model.

14 Claims, 6 Drawing Sheets

(56) References Cited

U.S. PATENT DOCUMENTS

| | | |
|---|---|---|
| 2007/0121897 A1 | 5/2007 | Patakula et al. |
| 2007/0129996 A1 | 6/2007 | Babine et al. |
| 2008/0288589 A1* | 11/2008 | Ala-Pietila ......... H04N 21/2402 |
| | | 709/204 |
| 2010/0017241 A1 | 1/2010 | Lienhardt |
| 2017/0064395 A1* | 3/2017 | Chaar .............. H04N 21/26208 |
| 2019/0140920 A1* | 5/2019 | Yan ......................... H04L 67/42 |
| 2019/0303859 A1* | 10/2019 | Dulebenets ........ G06Q 10/0835 |
| 2019/0311324 A1* | 10/2019 | Dulebenets ............ G06Q 10/04 |

* cited by examiner

| Interval | Shift 1 | Shift 2 | Shift 3 |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | 1 | | |
| 16 | 1 | 2 | |
| 17 | 1 | 2 | 3 |
| 18 | 1 | 2 | 3 |
| 19 | 1 | 2 | 3 |
| 20 | 1 | 2 | 3 |
| 21 | 1 | 2 | 3 |
| 22 | 1 | 2 | 3 |
| 23 | 1 | 2 | 3 |
| 24 | 1 | 2 | 3 |
| 25 | 1 | 2 | 3 |
| 26 | 1 | 2 | 3 |
| 27 | 1 | 2 | 3 |
| 28 | 1 | 2 | 3 |
| 29 | 1 | 2 | 3 |
| 30 | 1 | 2 | 3 |
| 31 | 1 | 2 | 3 |
| 32 | 1 | 2 | 3 |
| 33 | | 2 | 3 |
| 34 | | | 3 |
| 35 | | | |
| 36 | | | |
| 37 | | | |
| 38 | | | |
| 39 | | | |
| 40 | | | |
| 41 | | | |
| 42 | | | |
| 43 | | | |
| 44 | | | |
| 45 | | | |
| 46 | | | |
| 47 | | | |
| 48 | | | |

Tour Group: 1
Shift Template: 1

Day: 3

SYSTEM FOR SERVER SCHEDULING USING INTEGER PROGRAMMING

CROSS REFERENCE TO RELATED APPLICATION

This application claims the benefit of U.S. provisional patent application Ser. No. 62/677,294, filed May 29, 2018, and entitled "System and Method for Server Scheduling Using Integer Programming."

TECHNICAL FIELD

The present invention relates to the use of mixed integer linear programming models as applied to server scheduling. More specifically, a mixed integer linear programming (MILP) or mixed integer programming (MIP) model generation system having a reduced mathematical complexity.

BACKGROUND INFORMATION

Scheduling servers to perform various activities and tasks is a challenge faced in most systems including contact centers, hospitals, police stations, airports, supermarkets, manufacturing facilities, back-office operation centers and others. The objective is to automatically generate schedules for servers who perform one or more service types sought by customers or other entities such as machines or systems.

For example, a service type may be a particular type of work such as operating an assembly work station, back-office work such as reviewing insurance claims, providing a contact center service type such as technical service by phone, email, video or chat, providing a medical service such as triage, and other type of work or service. In these examples, a customer request may be a work unit to be processed at the assembly station, an insurance claim, customer request for technical help using phone, email, video or chat, a patient, and other types of work or service request.

A server may be a human worker or a machine with one or more skills. Examples for human servers include workers in a manufacturing facility, engineers, contact center agents, service representatives, doctors, emergency medical technicians, police officers, firefighters, bank tellers and back office workers. Examples for machine servers include robots, computer servers, telecommunication switches, and other types of autonomous or semi-autonomous systems. Servers may also be a combination of human workers and machines such as the self-service checkout machines and human supervisors assigned to one or more of them in a supermarket. A server has to have certain skills to perform and deliver each service type. Thus, server skills are associated with the corresponding services.

Servers may be located at one or more locations. Each location may have a time zone and its own operating hours to offer services. Servers at different locations may serve their own customers or together all customers globally. Some organizations may have hundreds of thousands of servers worldwide, each of which must be scheduled.

Servers provide services during their work periods and may need non-work periods both during (e.g. relief breaks) and between work periods (e.g. off days). For example, if a server is a human being, then a non-work period may be for resting, and if a server is a machine, it may be used for maintenance or cooling off.

Server schedules may include details for work and non-work periods such as work days, off days, work start and end time for work periods, relief break times and durations over a scheduling period. The scheduling period may be anytime period for which servers are to be scheduled.

To better match the server availability with customers' service needs, the scheduling period is divided into smaller time intervals. For example, a scheduling period of one week may be divided into 336 intervals with each interval being 30 minutes. An interval may be any time period such as 15, 30, 45, or 60 minutes, or may be one or more hours.

The scheduling period may also be divided into sub-periods consisting of a plurality of planning intervals for work planning purpose. For example, a scheduling period of one week may consist of 336 planning intervals, with each interval being 30 minutes long. The scheduling period may be further divided into seven consecutive sub-periods of 48 intervals, with each sub-period being one day. Likewise, if the scheduling period is 672 intervals (2 weeks), it may be divided into fourteen sub-periods of 48 intervals (days) or seven sub-periods of 96 intervals (2-day blocks).

The objective of any scheduling system is to generate server schedules that better line up server and skill availability with customer needs over the scheduling period to meet one or more service delivery targets. schedules are also generated to minimize the total cost of meeting these targets. Examples for service targets include 80% of customer service requests answered in 20 seconds, average speed of answer target of 100 seconds, no more than 3% abandonments, 80% of work orders, emails or back office cases completed within 24 hours of receipt, 90% of patients coming to an emergency room be seen by a nurse within 30 minutes of arrival, maximize profits or revenues in one or more planning intervals or over the entire scheduling period.

Mixed integer linear programming has been proposed as a means of using a mathematical model to optimize server schedules. However, actual application of the model has often been limited by the large number of variables in a given model. Some models include trillions of variables. Except for some very small cases, such models are not storable or solvable in industrial scheduling environments with existing computer hardware and software. Thus, a very large number of variables renders the calculation of optimized schedules impracticable. Using a MIP model can produce a significant cost savings of about 5% to about 20% of total server wages and fixed costs over simply following "rules of thumb." However, if the cost of entering the data and, when the required hardware and software are available, running the model exceeds the cost savings from using the model, then the benefit of the MIP model is lost. Improving the models to reduce the number of variables and constraints as well as the process of model creation is important for making mixed integer linear programming a practical, usable tool.

One example of the use of mixed integer linear programming is disclosed in U.S. Pat. No. 7,725,339, which was issued to T. Aykin on May 25, 2010. This patent discloses contact center scheduling using integer programming. Agent and skill requirements are acquired for all scheduling periods and contact types. The agent skill groups, agent workgroups, tour and shift scheduling rules, agent availability, and other criteria to be optimized are also required by the system. Using these parameters, a mixed integer linear programming model is developed. This model is then optimized utilizing a Branch and Bond algorithm as well as a rounding algorithm. The mixed integer programming model described in U.S. Pat. No. 7,725,339 defines an extra shift variable for every shift start time, as well as a separate inequality with multiple variables for each break. Thus, the number of variables required for this system, as well as the number of inequalities that must be optimized, is greater than the number used by the present invention. U.S. Pat. No. 7,725,339 also does not include any work before constraints directly in the model with break variables and related constraints.

U.S. Pat. No. 8,612,272, which was issued to T. Aykin on Dec. 17, 2013, discloses a system for skills-based staffing and scheduling. The system begins with acquiring scheduling period having a plurality of planning periods, acquiring a plurality of contact groups, acquiring service level targets for the contact groups, and acquiring contact volume and service time forecasts. Skill groups of agents, as well as scheduling rules, are acquired. Initial schedules are acquired. Beginning with the highest skill group, a plurality of agents are un-scheduled. The remaining skill groups are left scheduled, and the minimum staffing requirements are determined. New schedules are generated. The process is repeated for each skill group. After all skill groups are processed, the process begins again, repeating until a stopping criteria is met. This patent uses a mixed integer programming model described in U.S. Pat. No. 7,725,339.

U.S. Pat. No. 5,911,134, which was issued to R. M. Castonguay et al. on Jan. 8, 1999, discloses a method for planning, scheduling, and managing personnel. The team of servers is organized into a plurality of management units. Each management unit has one or more groups of individual servers. One or more tour templates, each describing a work shift, work rules, and operating constraints, are defined. The event load expected to occur during a given time period is forecast, permitting determination of the number of servers required for that time period. The expected event load is then allocated among the management units.

U.S. Pat. No. 6,044,355, which was issued to G. B. Crockett et al. on Mar. 28, 2000, discloses a method of scheduling personnel for telephone call centers. The system uses a simulation tool to predict the fraction of scheduled agents from each skill group that will be available for each call type during each time interval being scheduled. A feedback mechanism is used to adjust staffing and skills usage data between iterations of the simulation until the schedule being tested through the simulator meets the acceptance criteria.

U.S. Pat. No. 6,192,346, which was issued to E. E. Greene on Feb. 20, 2001, discloses a vacation and holiday scheduling method. The number of the vacation days allowed is determined based on the number of available as well as the business unit requirements. Employees are permitted to bid on vacation days based on seniority.

U.S. Pat. No. 6,278,978, which was issued to D. Andre et al. on Aug. 21, 2001, discloses an agent scheduling system. The system on schedules and agent from a shift in the schedule. A score function for each of a plurality of possible schedules having the agent scheduled for different possible shifts are then evaluated. An approved schedule is then selected from among the plurality of possible schedules. The steps are repeated until an optimal schedule is obtained. Break schedules can also be optimized by un-scheduling a break, evaluating a score function for other possible break times, and selecting a break time with an improved score. As before, the process is repeated until an optimal schedule is obtained.

As the above examples illustrate, various scheduling systems are either limited in the number of factors that can be taken into consideration, or use some "rule of thumb," resulting in schedules with high cost and inefficiencies. Accordingly, there is a need for a scheduling system that is capable of optimizing server schedules based on a variety of criteria, while accounting for these criteria utilizing a reduced number of variables to make it possible to store and solve the MIP model. Reducing the number of variables to a range of a few thousand to 2,000,000 variables significantly increases the practicality of finding optimized solutions to the models. Such a system would simplify the computational requirements, make better use of available processor capability, and provide more effectively optimized server scheduling. Such optimized scheduling not only ensures that customer needs are met in an effective and timely manner, but also ensures that access servers are not scheduled, thereby maximizing the value delivered at minimize cost.

SUMMARY

The above needs are met by a computer-implemented method for scheduling servers. The method comprises acquiring a scheduling period, with the scheduling period being divided into a plurality of sub-periods. The method further comprises acquiring tour group information, with the tour group information including at least one of work days, off days, start times, end times, break windows, and work before rules for breaks. Each of the start times, end times, and break windows begin at a beginning of a sub period. The work before rules for breaks define a number of sub-periods of work between breaks. The method further includes acquiring criteria to be optimized by the system. A mixed integer programming model is generated. The mixed integer programming model includes at least one shift variable. The at least one shift variable is defined to include a time for one break within the at least one shift variable. A solution algorithm is applied to the mixed integer programming model. A schedule is generated, with the schedule including work days, off days, start times, end times, and break times for each server.

The above needs are further met by a system for scheduling servers. The system comprises a database. The database has memory containing a scheduling period, with the scheduling period being divided into a plurality of sub-periods. The database further contains tour group information, with the tour group information including at least one of work days, off days, start times, end times, break windows, and work before rules for breaks. The start times, end times, and break windows each begin at a beginning of a sub period. The work before rules for breaks define a number of sub-periods of work between breaks. The database also includes criteria to be optimized by the system. The system further comprises a mixed integer programming model generator. The mixed integer programming model generator has memory containing executable instructions for generating a mixed integer programming model. The mixed integer programming model includes at least one shift variable, with the at least one shift variable being defined to include a time for one break within the at least one shift variable. The system further includes a schedule detail generator. The schedule detail generator has memory containing executable instructions for applying a solution algorithm to the mixed integer programming model, and for generating a schedule. The schedule includes work days, off days, start times, end times, and break times for each server.

These and other aspects of the invention will become more apparent through the following description and drawings.

BRIEF DESCRIPTION OF THE DRAWINGS

Like reference characters denote like elements throughout the drawings.

DETAILED DESCRIPTION

Referring to the drawings, an example of a scheduling system, an example of a model generator for the scheduling system, and an example of a solution method are illustrated.

In order to provide an optimized staffing solution, the staffing requirements should be determined. Some examples the scheduling system utilize forecasts of number of customer requests, average service time per customer request in intervals over the scheduling period for different skill types are used together with a staffing model such as Erlang C, Erlang A or simulation to determine the staffing requirements levels.

These staffing requirements are matched to available servers based on server skills as well as the scheduling rules for those servers. The scheduling rules include the required number of work and off sub-periods, work period (or shift) start times and work period length, number and duration for relief breaks, required work time between breaks, and break windows during shifts for sub-periods.

The system retrieves from one or more computers or storage media the server requirements in the intervals over scheduling period, scheduling rules for different server types, server skills and locations to generate a Mixed Integer Programming model ("MIP model"). The model consists of a plurality of variables, constraints and objective function. A solution of the MIP model provides a set of values for the variables that meet the constraints of the MIP model. The system applies a solution algorithm to the MIP model to find a solution that minimizes or maximizes the objective function. Furthermore, the system processes and generates schedule details with specific work and off days, and daily start times, shift lengths, break times and durations for work days for each server according to the solution of the MIP model.

Figure 1:
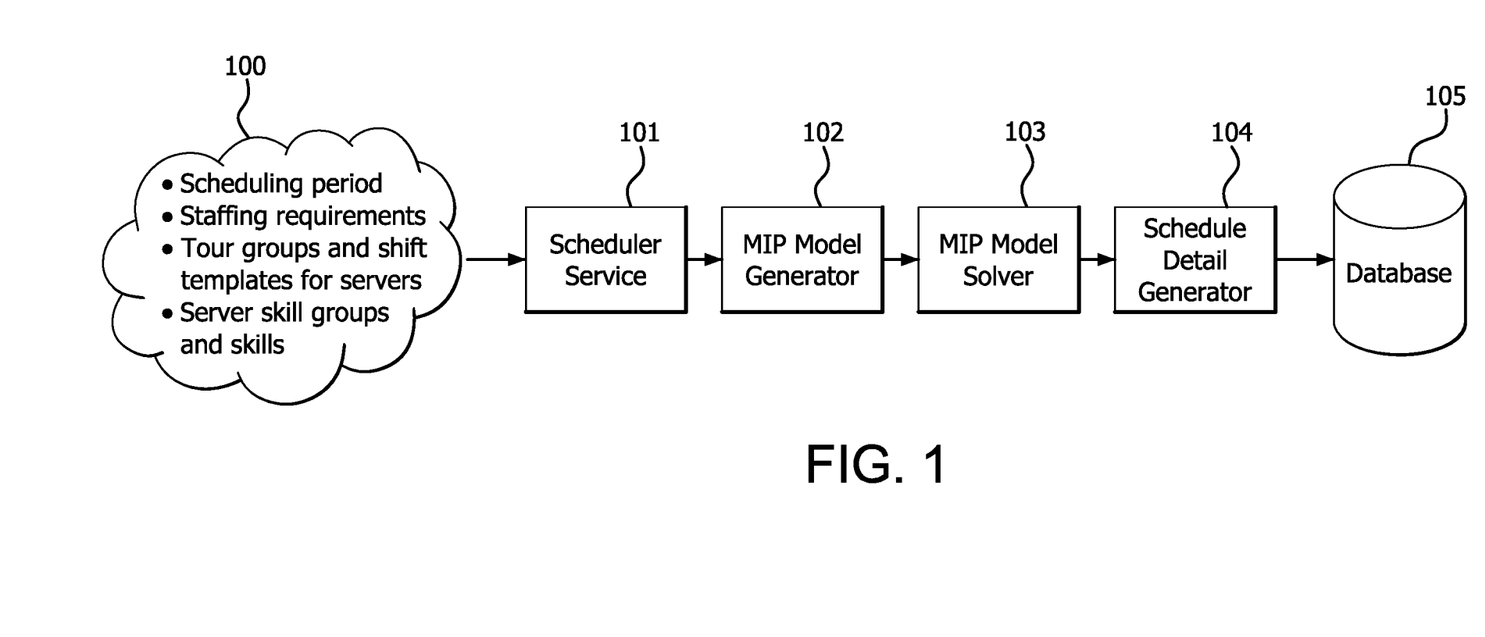
FIG. 1 is a high-level schematic diagram of the architecture for a computer-implemented scheduling system.

FIG. 1 illustrates an embodiment of the scheduling system, and its computer implementation with scheduler service 101, a schedule MIP model generator 102, an MIP model solver 103, a schedule detail generator 104, and a database 105. In the illustrated example, the scheduler service 101 retrieves from one or more computers, database, storage media or users 100 staffing requirements over a scheduling period, server skill groups, skills, and scheduling rules, and provides this information to the MIP model generator 102. This information may be stored in the database in the form of a matrix, with the rows and columns of each matrix corresponding to specific types of data to be used by the MIP model generator 102. Alternatively, the information may be extracted from databases that organize the data in different forms, and then organized into matrix form prior to being provided to the model generator 102. The MIP model generator 102 determines the variables and constraints needed in the MIP model of the invention to enforce the scheduling rules, skill availability, server locations, generates these constraints and variables with their coefficients in the constraints, and stores the MIP model with this information in the computer's memory. The MIP model solver 103 retrieves the MIP model information from the computer's memory, applies a solution algorithm to find a solution meeting one or more termination criteria. It provides the values in the solution found for the variables to the schedule detail generator 104. The schedule detail generator 104 generates schedule details for servers using the values of the variables in the said solution and stores them on one or more computers, database or storage media 105. Some examples of the system may include a user interface and one or more of the modules 100-105 can be combined or functioning together or as part of some other systems and running on different computers.

Servers are scheduled to meet the staffing requirements retrieved by the scheduler service 101 from the storage media 100 as best as possible. The scheduler service 101 also retrieves from the storage media 100 a list of servers to be scheduled and their skills. Let the set of service types offered by a system be SK. Servers need to have one or more known skills to offer a service type. Each server may have one or more of these skills to offer services in SK and may also have skill levels identified. In some examples, a skill level value may represent server's proficiency level in that skill. In other examples, a skill level may represent a server's preference, priority or some other criticality value for that skill.

A group of servers with identical set of skills and skill levels form a skill group. Let the set of all skill groups be G and the set of skills of the servers in skill group u, u∈G, be $S_u$.

In some examples, one or more service types are provided. In some examples, every server may have skills and skill levels needed for all service types provided. Thus, all servers belong to one skill group with identical set of skills and skill levels, in which case they may be considered to be universal servers. In other examples, there may be two or more distinct skill groups, requiring skill-based scheduling. Servers in any two skill groups have at least one difference in their skill or in their skill level. A server can only be a member of one skill group.

In the illustrated example, the scheduling period is one week consisting of seven sub-periods with each being a day long. The scheduling period is divided into planning intervals. It should be clear to a person with ordinary skills in the art that shorter or longer scheduling periods may be divided into shorter or longer sub-periods. Moreover, sub-periods may or may not be of equal length.

Figure 2:
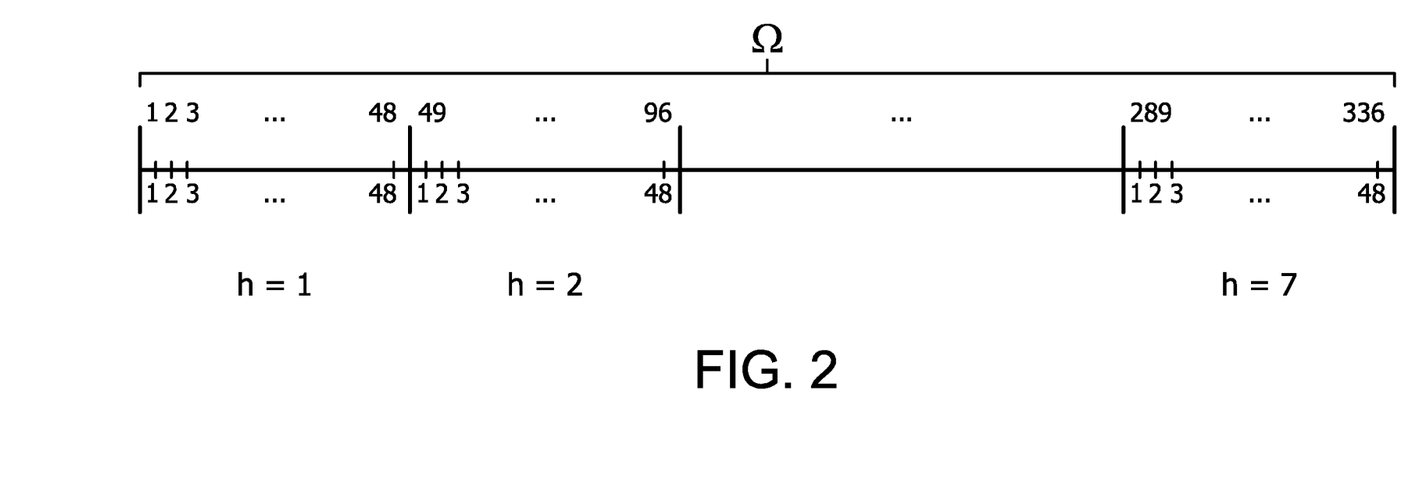
FIG. 2 is a diagrammatic view showing an example of interval division of a day of a week.

Planning intervals in the scheduling period are numbered sequentially in the time order, and designated as the scheduling period interval index. Let the set of all planning intervals be $\Omega$. FIG. 2 shows a scheduling period which is one week long with an interval length of 30 minutes, $\Omega=\{t | 1 \leq t \leq 336\}$. All planning intervals including shift start times, break start times, sets of start times or intervals made reference to in the remainder of the particular embodiment selected for the description of the method of the invention use the scheduling period interval indexes. Similarly, the day index, h=1, 2, . . . , 7, is used in the definition of some variables and constraints for shift and work pattern planning over the scheduling period.

The scheduling period in FIG. 2 may also be stated as seven days h=1, 2, . . . , 7, each with intervals numbered from 1 to 48 ("daily interval index"). Let the planning intervals on day h be $\Omega_h$, h=1, 2, . . . , 7. All planning intervals including shift start times, break start times or intervals made reference to in the remainder of the particular embodiment selected for the description of the method of the invention use the interval indexes. It should be clear to a person with ordinary skills in the art that the present invention is not limited to this particular embodiment using the scheduling period interval indexes in $\Omega$h or daily interval indexes $\Omega_h$, h=1, 2, . . . , 7. The method of the invention can easily be described using day index h=1, 2, . . . , 7 and daily interval indexes. Similarly, the day index, h=1, 2, . . . , 7, is used in the definition of some variables and constraints. A shift or break may start in an interval on one day and continue into the next day. The day and interval indexes are applied to these variables and constraints accordingly in the MIP model of the invention. For example, with a 30-minute interval length, if an 8-hour shift starts in interval 41 (8:00 p.m.) on day 2, it will end at the end of interval 8 (4:00 a.m.) on day 3.

A set of scheduling rules specifying weekly and daily shifts is called a tour group. The scheduler service 101 retrieves one or more tour groups to be followed for each server from the storage media 100. Two or more servers may have the same tour groups or scheduling rules. A tour group specifies the number of work and off days for a server. For example, a full-time tour group may require servers to work five days and take two days off over a scheduling period of one week.

A tour group also specifies a shift template for every work day. A shift template provides the scheduling rules for a work day. A tour group may have one or more shift templates. Furthermore, the tour group may have a minimum and maximum number of work days. A tour group may also have certain days marked as off days, optional (work scheduled if needed), must-work days or a combination of them.

A shift template may also specify how daily shift start times may vary. For example, the shift template may specify an earliest shift start and a latest shift start time during a day, and may allow shifts to start every one or more planning intervals between them. Thus, the shift template may specify an 8-hour shift with possible shifts start times of every interval after the daily service system open time at 7 am, provided that no shift will end after the service system close time for the day. A shift template may require the same start time on every work day for a server as well.

Let the set of tour groups assigned to at least one server be T. Each tour group k in T comprises a set of shift templates $ST_k$. Let $DS_{knh}$ be the set of shift start times for tour group k using shift template n, n∈$ST_k$, on day h.

A shift template may have one or more breaks during its shift span. If breaks are included, then the duration and placement of those breaks will also be specified. A break may be one or more intervals long. A shift template may also have no break. The illustrated example of the MIP model is described with shift templates specifying a maximum of three breaks. In the illustrated example, the first and third breaks during a shift are assumed one interval and the second break two intervals long. It should be obvious to a person with ordinary skill in the art that that scheduling with shift templates with more than three breaks, and one or more intervals long breaks are within the scope of the present invention. A break start interval t cannot be before the shift start or after the shift end interval.

Figure 3:
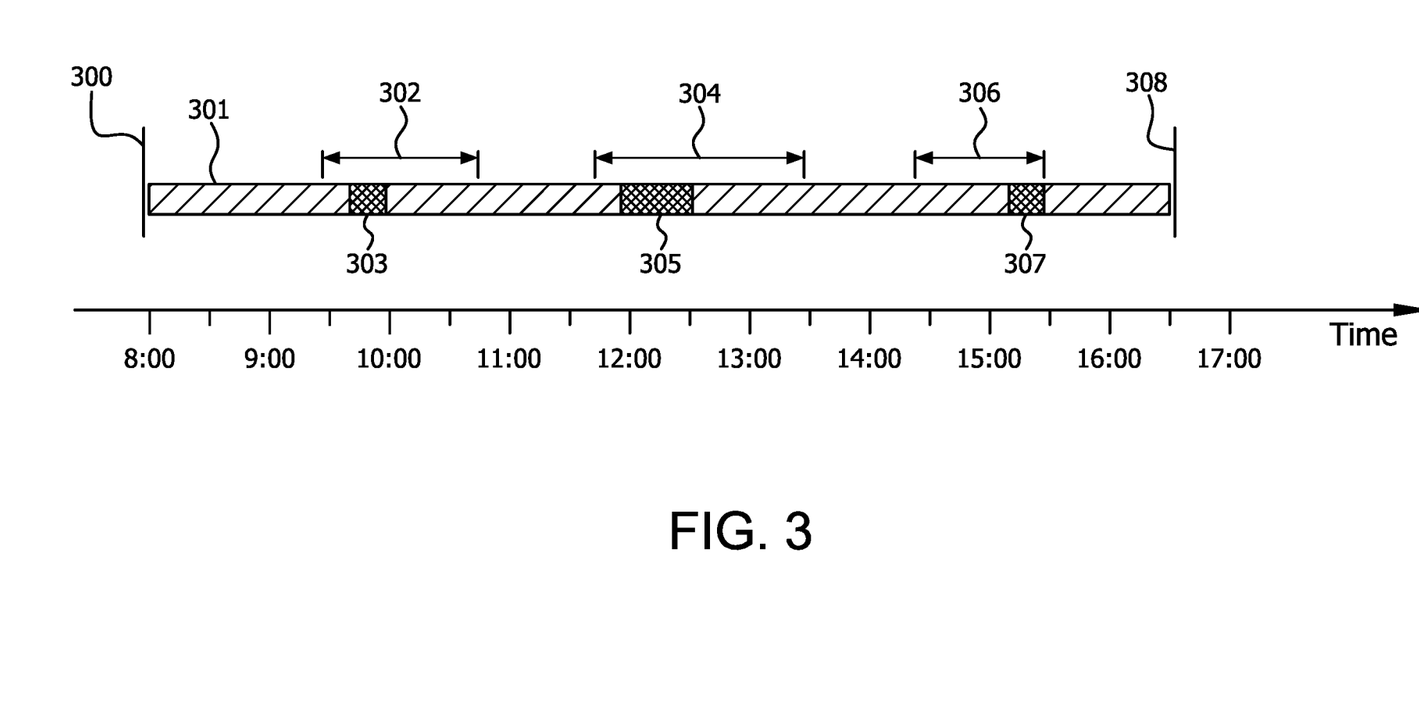
FIG. 3 is a diagrammatic view showing an example of a daily shift schedule with three break windows.

FIG. 3 shows a shift template with daily shift star time 300, daily shift end time 308, a first break 303, a first break window 302, a second break 305, a second break window 304, a third break 307, and a third break window 306. The shift template specifies work all times between its start 300 and end times 308, except during the scheduled break times 303, 305 and 307. The total duration between the shift start 300 and end 308 times is called shift length or shift span. A break may be fixed in its timing during the shift span or there may be a break window with start and end times allowing flexibility in its scheduling. For example, break windows 302, 304 and 306 are specified for the first, second and third breaks in FIG. 3. A break can only be scheduled to start in its window. This information is acquired at steps 500 and 502 of FIG. 5A.

For example, scheduling rules for the shift template may specify a one-interval long first break that must be scheduled to start at the beginning of any interval 1 hour after but no later than 2 hours after the shift start time. Similarly, the scheduling rules may also specify a two or more intervals long second break, and a one-interval long third break. The break window for the second break may start 3 hours and end 4 hours after the shift start time, and for the third break it may start 6 hours and end 7 hours after the shift start.

Specification of a break window may or may not allow a break to start at the end of a break window. If it is allowed, then a break scheduled to start at the end of a break window will be completed after the end of the break window. In the example described herein, break windows require breaks to start and end within their respective windows. Other examples may permit a break window to start the break at the end of its break window.

Scheduling rules may allow flexibility to better match the number of servers working in different intervals with the staffing requirements.

Server schedules may be optimized with respect to a variety of objectives. In one example, it may be the objective to find schedules that minimize the total server cost. In another example, they may minimize the paid server time while meeting the staffing requirements and all scheduling rules. In yet another example, they may maximize total sales or profit. It should be obvious to a person with ordinary skill in the art that server schedule optimization with different objectives is also within the scope of the method and system of the invention. Acquiring the optimization criteria occurs at step 504 in FIG. 5A.

Compared to an optimal set of schedules, if a non-optimal set of schedules is used, the result will be higher over staffing or under staffing in one or more intervals. Staffing overage occurs when the number of servers scheduled exceeds the staffing requirement in an interval. Staffing overages increase costs due to excess staffing. A staffing shortage occurs when the number of servers scheduled is less than the staffing requirements. Staffing shortages results in not meeting the service targets in a plurality of intervals.

To simplify the notation used in the description of the MIP model, a variable or set with subscripts is shown as flat text when the variable or set is itself is a subscript of another term. For example, $X_1$ is typed as $_{X1}$ in $\Sigma_{X1}$.

An example of an MIP model is first described for universal servers. The following notation is defined in order to describe the MIP model of the invention.

A tour group may or may not have a fixed number of work days. It may have a minimum and maximum number of work days specified over the scheduling period. Given the scheduling rules on work, optional and off days and the length of a tour group in terms of work and off days, all possible combinations of work and off-day patterns satisfying them are identified. Let $L_k$ be the set of all such possible combinations of work patterns, which is defined as including work days and off days. A work pattern is specified by a string of zeros (for off days) and ones (for work days.) For example, if the start day of a week is Monday, a pattern (1, 1, 1, 1, 1, 0, 0) with values corresponding to the successive days of the week from Monday through Sunday (from left to right) specifies 5 days of work from Monday through Friday, and two days off for Saturday and Sunday. Thus a work day has a value "1" and an off day has a value "0" in a work pattern in $L_k$. Let $A_{klh}$ be equal to one if day h is a work day for servers assigned to work pattern 1, $l \in L_k$, for tour group k, and zero otherwise.

The following variables, parameters and sets are defined for the MIP model of the invention:

$X_{knihj}$ is the shift variable and represents the number of servers scheduled using tour group k, shift template n with the shift start time of interval i on day h and are starting their second break in interval j, $a_{knihjt}$ is equal to one if interval t, $t \in \Omega$, is within the shift span and not a second break interval t=j
  and $t \neq (j+1)$, $j \in BW2_{knih}$, for servers who are scheduled using tour group k, shift template n, have the shift start time of interval i on day h, and starting their second breaks in interval j,
  and zero otherwise, $BW1_{knih}$ is the set of break start times in the break window for the first break for servers who are scheduled using tour group k, shift template n, and have the shift start time of interval i on day h, $BW2_{knih}$ is the set of break start times in the break window for the second break for servers who are
  scheduled using tour group k, shift template n, and have the shift start time of interval i on day h, $BW3_{knih}$ is the set of break start times in the break window for the third break for servers who are scheduled using tour group k, shift template n, and have the shift start time of interval i on day h, breaks in interval j, and zero otherwise, $X_{kniht}$ is defined for every tour group k, shift template n, $n \in ST_k$, day h, shift start time i, $i \in DS_{kh}$, and the second break start times t, $t \in BW2_{knih}$.

$a_{knihjt}$ is equal one if interval t, $t \in \Omega$, is in the shift span of tour group k, shift template n with a shift start interval i on day h, and zero otherwise. $a_{kniht}$ is also equal to zero for the second break intervals. That is, when t=j and t=(j+1), $j \in BW2_{knih}$.

It is often desired to have servers to work at least a minimum duration between successive breaks to avoid some breaks being scheduled too close to each other. FIG. 2 shows an example with a shift with three break windows. For the description of an example work before requirement in FIG. 2, a 15-minute interval length is considered. In FIG. 2, the break window for the first break starts at 9:30 and ends at 10:45. Thus, a first break can be scheduled to start at 9:30, 9:45, 10:00, 10:15, 10:30, assuming that the duration of the first break is 15 minutes long. The break window for the second break starts at 11:45 and ends at 13:30. Thus, a second break can be scheduled to start at 11:45, 12:00, 12:15, 12:30, 12:45 and 13:00. If the shift template in this case allows a break to start within its break window but end after the end of its break window, then the last break start intervals of 10:45 as a first break start time and 13:15 and 13:30 as a second break start time are included.

If a work before requirement of one hour and thirty minutes is specified for the second break, then a server has to work at least 1 hour and 30 minutes after the first break before taking the second break. Thus, the first break start time of 9:30 and the second break start time of 11:45 would meet the work before requirement for the second break since a server would work 2 hours after the end of the first break before starting the second break. The first break start time of 10:30 and the second break start time of 11:45, however, violate the work before requirement for the second break since a server would only work 1 hour and 15 minutes after completing the first break. The work before requirement for a break specified in a shift template is received as part of the scheduling parameters.

The MIP model of the present invention defines two types of break variables for each break specified in a shift template to model the work before requirement. To describe these variables, reference is made to the first and second breaks and break windows shown in FIG. 2 with a work break requirement of 1 hour 30 minutes for the second break. The first break start intervals of 9:30, 9:45 and 10:00 have at least 1 hour and 30 minutes of work before all second break start intervals in its break window. One break variable for each of these first break start intervals, which are unrestricted break times, is defined for the shift variables with the same tour group, shift template, shift start time and day. Thus, regardless of the second break start interval, these break variables specify the number of first breaks scheduled in these intervals for shift variables, $X_{kniht}$, $t \in BW2_{knih}$.

Some second break start times, when scheduled together with the first break time intervals other than the unrestricted break times, will not satisfy the work before requirement for the second break. For example, the first break start time of 10:30 (with the 15-minute first break ending on 10:45) and second break start times of 11:45 and 12:00 do not meet the work before requirement. However, any other second break start time satisfies the work before requirement with the first break start interval of 10:30. Thus, a first break variable can be defined for the break start time of 10:30, but only for shift variables $X_{kniht}$, $t \in BW2_{knih}$, with second break times satisfying the work before requirement. These break times are restricted break times. These include the shift variables $X_{kniht}$ with the second break start interval t=12:15, 12:30, 12:45 or 13:00.

Restricted break times are the first break start times that can be scheduled with only a subset of the second break start times to satisfy the work break requirements. Thus, a first break start time is either a restricted break start time or unrestricted break start time. It is also possible to have some first break start times specified that may violate the work before requirement with all second break start times in $BW2_{knih}$. Likewise, some second break start times may not satisfy the work before requirement with any of the first break start times. Such first and second breaks start times are infeasible and therefore ignored by the system.

Let $UBW1_{knih}$ be the set of unrestricted first break start times. That is, $UBW1_{knih} = \{t_1 | (t_2-t_1) \geq wb2_{knih}$ for $\forall t_2 \in BW2_{knih}, t_1 \in BW1_{knih}\}$ where $wb2_{kn}$ is the work before requirement specified for the second break of shift template n, tour group k with start time of i on day h. Unrestricted break variables are defined for all shift variables $X_{kniht}$, $t \in BW2_{knih}$. This is shown in step 510 in FIG. 5A.

Similarly, let $RBW1_{knih(t2)}$ be the set of restricted first break start times for the second break start interval of $t_2$, $t_2 \in BW2_{knih}$. That is, $RBW1_{knih(t2)} = \{t_1 | (t_2-t_1) \geq wb2_{knih}, t_1 BW1_{knih}$ and $t_1 \in UBW1_{knih}\}$, $t_2 \in BW2_{knih}$. Restricted break variables are defined for each t, $t \in RBW1_{knih(t2)}$, for shift variable $X_{kniht2}$ with second break start interval of $t_2$. This is shown in step 512 in FIG. 5A.

Furthermore, let $UBW3_{knih}$ be the set of unrestricted third break start times. That is, $UBW3_{knih}=\{t_3|(t_3-t_2)\geq wb3_{knih}$ for $\forall t_2 \varepsilon BW2_{knih}, t_3 \varepsilon BW3_{knih}\}$ where $wb3_{kn}$ is the work before requirement specified for the third break of shift template n, tour group k with start time of i on day h. Unrestricted break variables are defined for all shift variables $X_{kniht}$, $t \varepsilon BW2_{knih}$.

Similarly, let $RBW3_{knih(t2)}$ be the set of restricted third break start times for the second break start interval of $t_2$, $t_2 \varepsilon BW2_{knih}$. That is, $RBW3_{knih(t2)}=\{t_3|(t_3-t_2)\geq wb3_{knih}, t_3 \varepsilon BW3_{knih}$ and $t_3 \varepsilon UBW3_{knih}\}$, $t_2 \varepsilon BW2_{knih}$. Restricted break variables are defined for each t, $t \varepsilon RBW3_{knih(t2)}$, for shift variable $X_{kniht2}$ with second break start interval of $t_2$.

The following unrestricted break variables and restricted break variables are defined for the MIP model of the invention:

$UB1_{kniht}$ is the number of servers scheduled using tour group k, shift template n with a start time of i on day h and taking their first break at the unrestricted break time t, $t \varepsilon UBW1_{knih}$, and $RB1_{kniht(j)}$ be the number of servers scheduled using tour group k, shift template n with a start time of i on day h and taking their first break at the restricted break time t, $t \varepsilon RBW1_{knih(j)}$, $j \varepsilon BW2_{knih}$.

$UB3_{kniht}$ is the number of servers scheduled using tour group k, shift template n with a start time of i on day h and taking their third break at the unrestricted break time t, $t \varepsilon UBW3_{knih}$, and $RB3_{kniht(j)}$ be the number of servers scheduled using tour group k, shift template n with a start time of i on day h and taking their third break at the restricted break time t, $t \varepsilon RBW3_{knih(j)}$, $j \varepsilon BW2_{knih}$.

The following two constraints ensure that one first break is scheduled for every server scheduled using tour group k, $k \varepsilon T$, shift template n, $n \varepsilon ST_k$ with shift start time i on day h, $i \varepsilon DS_{knh}$:

$$\Sigma_{t \varepsilon RBW1knih(j)} RB1_{knih(j)} \leq X_{knihjj} \varepsilon BW2_{knih}, \quad (1)$$

$$\Sigma_{t \varepsilon UBW1knih} UB1_{kniht} + \Sigma_{j \varepsilon BW2knih} \Sigma_{t \varepsilon RBW1knih(j)} RB1_{kniht(j)} = \Sigma_{j \varepsilon BW2knih} X_{knihj} \quad (2)$$

Constraint (1) ensures that the number of first breaks scheduled at the restricted first break start times for the second break start time j will be less than or equal to the number of servers scheduled using tour group k, shift template n with start time of i on day h and starting their second breaks in interval j.

Constraint (2) ensures that the number of first breaks scheduled at the unrestricted first break times and at the restricted first break times for different second break times is equal to the number servers scheduled using tour group k, shift template n and start time i on day h so that every server will receive a first break without violating the work before requirement for the second break times. These constraints are defined at step 514 in FIG. 5A.

When the first break times scheduled satisfy constraints (1) and (2), a feasible assignment of first break times is achieved by first pairing the first breaks scheduled at the restricted first break times with the respective second break times. Additional first breaks scheduled at the unrestricted first break times are then paired with second break times based the on the number servers scheduled at those second break times.

Likewise, the following two constraints ensure that one third break is scheduled for every server scheduled using tour group k, $k \varepsilon T$, shift template n, $n \varepsilon ST_k$ with shift start time i on day h, $i \varepsilon DS_{knih}$:

$$\Sigma_{t \varepsilon RBW3knih(j)} RB3_{knih(j)} \leq X_{knihjj} \varepsilon BW2_{knih}, \quad (3)$$

$$\Sigma_{t \varepsilon UBW3knih} UB3_{kniht} + \Sigma_{j \varepsilon BW2knih} \Sigma_{t \varepsilon RBW3knih(j)} RB3_{kniht(j)} = \Sigma_{j \varepsilon BW2knih} X_{knihj} \quad (4)$$

In other examples, there may be work before requirement for one or more breaks specified in shift templates. In this case, the MIP models described in U.S. Pat. No. 7,725,339 can be modified to include work before constraints as described for the MIP model of the present invention. Therefore, these modifications of the MIP models described in U.S. Pat. No. 7,725,339 are within the scope of the present invention.

Furthermore, the definitions of shift variables $X_{kniht}$ may include first or third break times instead of the second break time in the illustrated example of an MIP model. In these cases, restricted and unrestricted break variables will be defined for breaks that are not included in the definition of $X_{kniht}$.

In other example MIP models, two or more break times can be included in the definition of shift variables $X_{kniht}$. For example, the MIP model of the invention allows shift templates that may have four or more breaks with work before requirements. In the case of a shift template with four or five breaks, the work before requirements can be included in the MIP model by specifying the second and fourth break times (breaks are numbered in the time order during the shift span) in the definition of the shift variables $X_{kniht2t4}$, where $t_2$ and $t_4$ are the break start times for the second and fourth breaks. Thus, a shift variable $X_{kniht2t4}$ is defined for every second and fourth break time combination. Likewise, if a shift template has six or more breaks, then combinations of second, fourth and sixth break times are included in the shift variable definitions.

Furthermore, unrestricted break time may be included with the restricted break times and the unrestricted break variables may be defined similar to the restricted break variables for each break start time for the next break. In this case, constraints (1) and (3) above become equations and constraints (2) and (4) become redundant. These variations of the MIP model of the invention are also within the scope of the present invention.

Figure 5A:
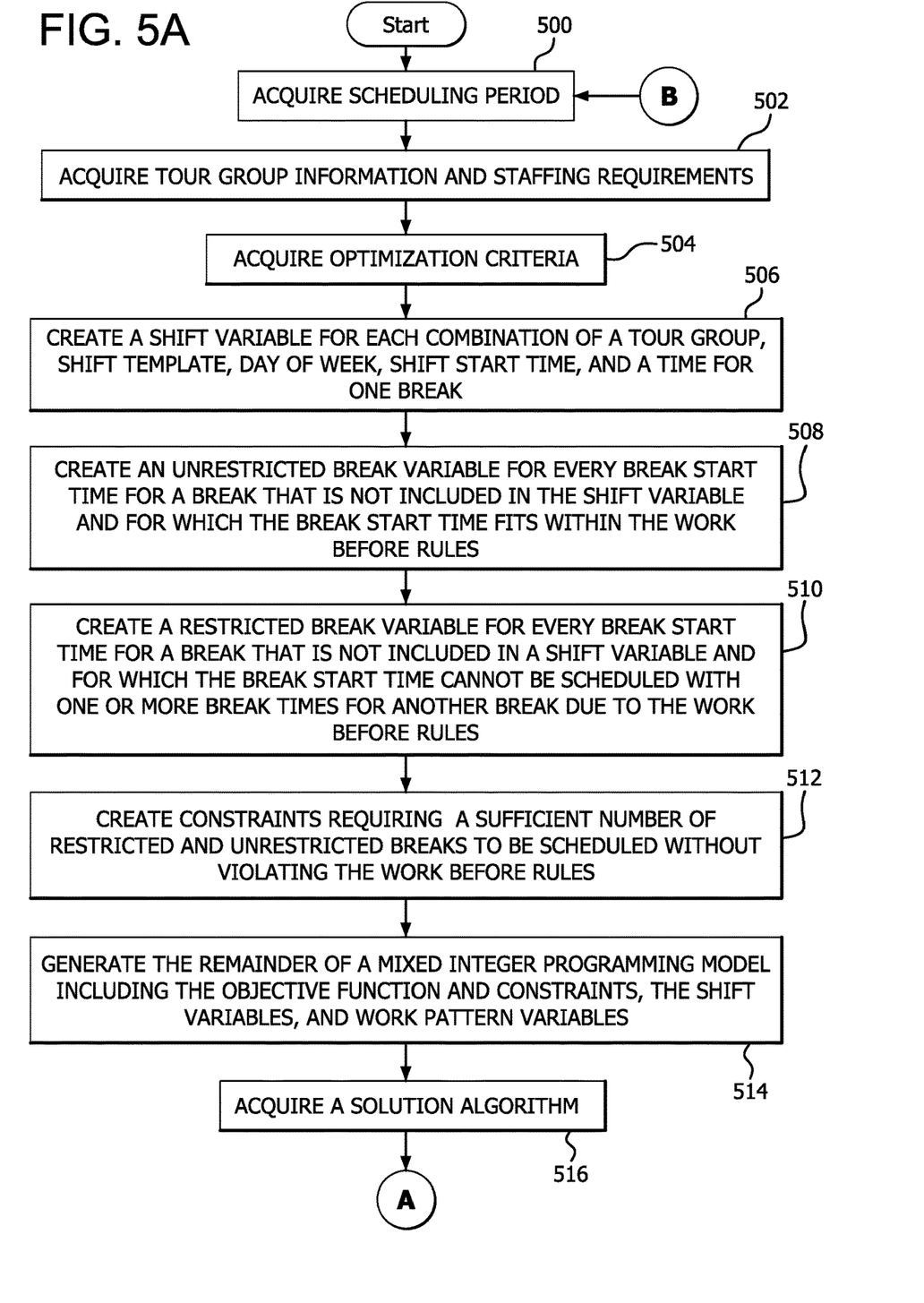
FIGS. 5A-5B are a flowchart showing an example of a process for building and solving a mixed integer programming model for generating a schedule according to the system of FIG. 1.

The remainder of the MIP model is generated at step 514 of FIG. 5A. The illustrated example of the MIP model considered above is stated as follows.

$$\begin{aligned}\text{Minimize} & \Sigma_{k \varepsilon T} \Sigma_{l \varepsilon Lk} C_{kl} Q_{kl} + \\ & \Sigma_{k \varepsilon T} \Sigma_{n \varepsilon STk} \Sigma_{h}^{h} \Sigma_{i \varepsilon DSknh} \Sigma_{j \varepsilon BW2knih} C_{knihr} X_{knihj} + \\ & \Sigma_{t \varepsilon \Omega} P_t S_t \end{aligned} \quad (5)$$

Subject to $$\begin{aligned}& \Sigma_{k \varepsilon T} \Sigma_{n \varepsilon STk} \Sigma_{h} \Sigma_{i \varepsilon DSknh} \Sigma_{j \varepsilon BW2knih} a_{knihjt} X_{knihj} - \\ & \Sigma_{k \varepsilon T} \Sigma_{n \varepsilon STk} \Sigma_{h} \Sigma_{i \varepsilon UT1knh} UB1_{kniht} - \\ & \Sigma_{k \varepsilon T} \Sigma_{n \varepsilon STk} \Sigma_{h} \Sigma_{j \varepsilon BW2knih} \Sigma_{t \varepsilon RT1knht(j)} RB1_{kniht(j)} - \\ & \Sigma_{k \varepsilon T} \Sigma_{n \varepsilon STk} \Sigma_{h} \Sigma_{t \varepsilon UT3knh} UB3_{kniht} - \\ & \Sigma_{k \varepsilon T} \Sigma_{n \varepsilon STk} \Sigma_{h} \Sigma_{j \varepsilon BW2knih} \Sigma_{t \varepsilon RT3knht(j)} RB3_{kniht(j)} + S_t - \\ & E_t = b_t, t \varepsilon \Omega \end{aligned} \quad (6)$$

$$\Sigma_{t \varepsilon RBW1knih(j)} RB1_{knih(j)} \leq X_{knihj}, k \varepsilon T, n \varepsilon ST_k, i \varepsilon DS_{knh}, h=1, \ldots, 7, j \varepsilon BW2_{knih}, \quad (7)$$

$$\begin{aligned}& \Sigma_{t \varepsilon UBW1knih} UB1_{kniht} + \Sigma_{j \varepsilon BW2knih} \Sigma_{t \varepsilon RBW1knih(j)} RB1_{kniht(j)} = \Sigma_{j \varepsilon BW2knih} X_{knihj}, k \varepsilon T, n \varepsilon ST_k, i \varepsilon DS_{knh}, \\ & h=1, \ldots, 7, \end{aligned} \quad (8)$$

$$\Sigma_{t \varepsilon RBW3knih(j)} RB3_{knih(j)} \leq X_{knihj}, k \varepsilon T, n \varepsilon ST_k, i \varepsilon DS_{knh}, h=1, \ldots, 7, j \varepsilon BW2_{knih}, \quad (9)$$

$$\Sigma_{t \in UBW3knih} UB3_{kniht} + \Sigma_{j \in BW2knih} \Sigma_{t \in RBW3knih(j)} RB3_{kniht}$$
$$(j) = \Sigma_{j \in BW2knih} X_{knihj}, k \in T, n \in ST_k, i \in DS_{knh}, h = 1, \ldots, 7,$$  (10)

$$\Sigma_{l \in Lk} A_{klh} Q_{kl} = \Sigma_{n \in STk} \Sigma_{i \in DSkh} \Sigma_{j \in BW2knih} X_{knihj}, k \in T, h = 1, \ldots, 7,$$  (11)

$$\Sigma_{l \in Lk} Q_{kl} \leq D_k^{max}, k \in T,$$  (12)

$$\Sigma_{l \in Lk} Q_{kl} \geq D_k^{min}, k \in T,$$  (13)

$X_{knihtj}, Q_{kl}, UB1_{kniht}, RB1_{kniht(j)}, UB3_{kniht}, RB3_{kniht(j)} \geq 0$
and integer, and $S_t$, and $E_t \geq 0$ for all $k \in T, n \in ST_k$,
$i \in DS_{knh}, l \in L_k, t \in \Omega, j \in BW2_{knih}$ and $h = 1, \ldots, 7$.  (14)

where
$UT1_{knht}$ is the set of shift start times on day h for shift template n and tour group k for which interval t, $t \in \Omega$, is an unrestricted first break start time, $RT1_{knht(j)}$ is the set of shift start times on day h for shift template n and tour group k for which interval t, $t \in \Omega$, is a restricted first break start time for the second break start time of j, $j \in BW2_{knih}$, $UT3_{knht}$ is the set of shift start times on day h for shift template n and tour group k for which interval t, $t \in \Omega$, is an unrestricted third break start time, $RT3_{knht(j)}$ is the set of shift start times on day h for shift template n and tour group k for which interval t, $t \in \Omega$, is a restricted third break start time for the second break start time of j, $j \in BW2_{knih}$, $Q_{kl}$ is the work pattern variable and represents the number of servers scheduled using tour group k and work pattern l, $D_k^{max}$ is the maximum number of servers that can be scheduled using tour k, $D_k^{min}$ is the minimum number of servers that must be scheduled (i.e. must-work servers) using tour group k, $C_{kl}$ is the weekly cost of scheduling a server using tour k and work pattern l, $c_{knih}$ is the daily cost of a server scheduled using tour group k and shift template n with shift start time of interval i on day h, $b_t$ is the staffing requirement in interval t, $S_t$ is the slack variable and represents the number of servers by which the servers scheduled and not on a break is less (staffing shortage) than the staffing requirement level in interval t, $E_t$ is overage variable and represents the number of servers by which the servers scheduled and not on a break is greater than (staffing excess) the staffing requirement level in interval t, $P_t$ is a large positive penalty cost for having staffing shortage in interval t.

In the MIP model (5-14), $Q_{kl}$ variables are the work pattern variables that specify work and off days according to pattern l, $l \in L_k$, assigned to schedules. The number of server schedules with tour group k and work pattern l is determined by the value of $Q_{kl}$.

Cost parameter $C_{kl}$ includes weekly server cost such as benefits, premium for a work pattern, and other weekly costs. $c_{knih}$ includes daily server costs such as wages, premium for a shift template or start time, and other daily costs. The objective of the MIP model of the invention (5) is to minimize the total weekly and daily server costs, and penalty costs due to staffing shortages.

Figure 4:
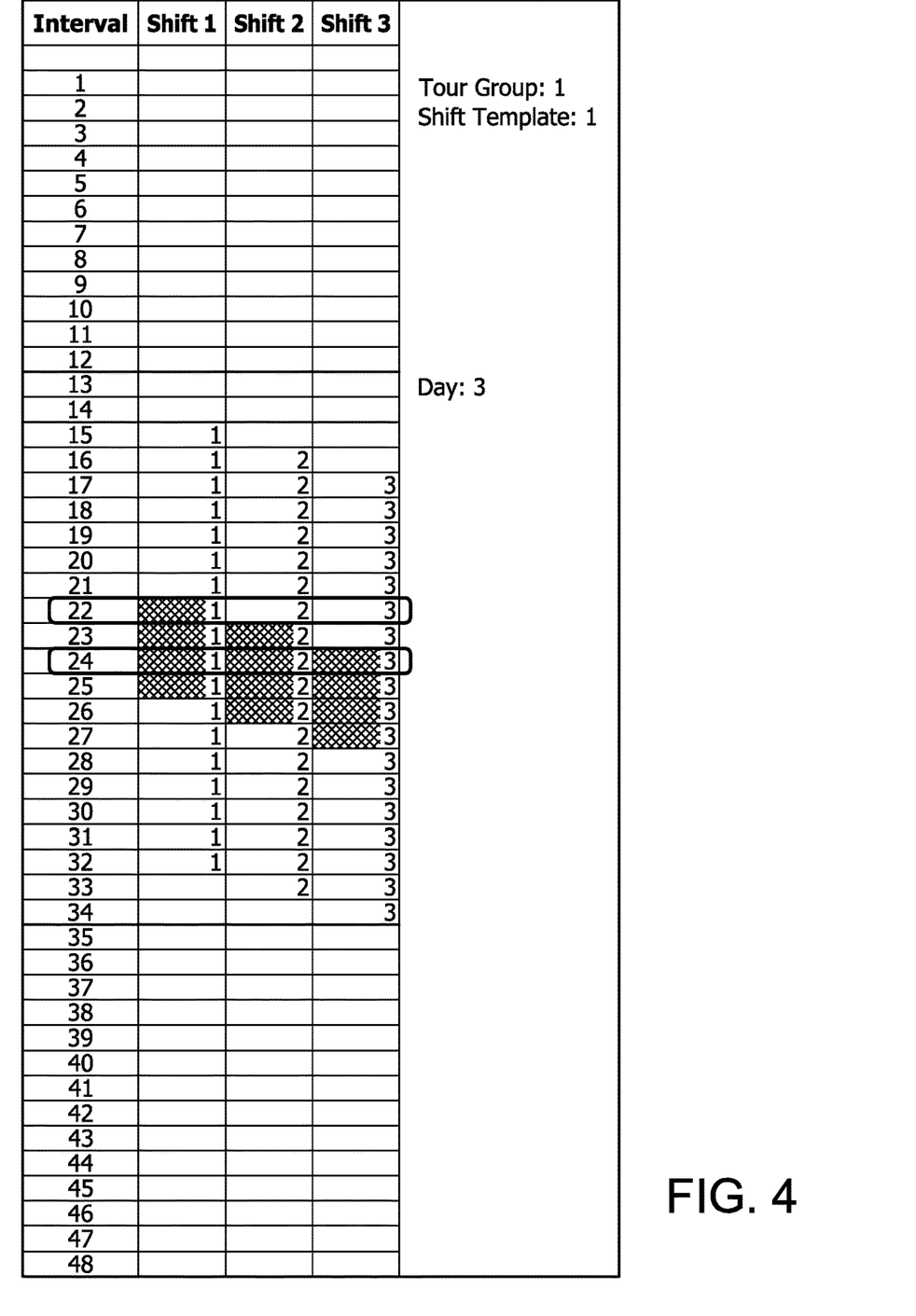
FIG. 4 is a diagrammatic view showing an example of three shifts with break windows, as well as a set of daily start times for which an interval is a break window.

FIG. 4 shows the relationship between a break windows BW and the set of start times UT. Three shifts each allowing for one break and their break windows are shown for day h=3, tour group k=1, shift template n=1, and shift start times of 111, 112 and 113 for shifts 1, 2, and 3, respectively. Thus, $BW1_{113\ 111} = \{118, 119, 129, 121\}$. In this case, the set of start time used in constraint (6) $UT1_{113\ 118}$ has only one shift start time $\{111\}$, and $UT1_{113\ 120}$ has three start shift times $\{111, 112, 113\}$.

The left hand side of constraint (6) is the total number of servers who are working in an interval. That is the number of servers whose scheduled shifts have interval t within their shift span minus the number of servers who will be on a break in interval t.

Constraints (7-8) ensure that one first break is scheduled for every server, if specified by the shift template used for its schedule. Likewise, constraints (9-10) ensure that one third break is scheduled for every server, if specified by the shift template used for its schedule.

If a shift template has only one break specified, break times are included in the definition of the shift variables $X_{knihtj}$. The MIP model of the invention will not have break variables or constraints (9-10) for this shift template. If a shift template specifies two breaks, then break times for the second break in time order is included in the definition of the shift variables $X_{knihtj}$. This is shown at step 506 of FIG. 5A. Break variables and constraints (9-10) are introduced for the first break.

Constraint (11) ensures that the daily shift schedules specified by the shift variables $X_{knihj}$ would permit creating complete schedules over the scheduling period meeting the work, optional and off days and the length of a tour group in terms of work and off days as specified by the scheduling parameters.

Constraint (12) ensures that the number of servers scheduled using a tour group does not exceed the maximum number of servers available to schedule using that tour group. Constraint (13) ensures that the minimum number of schedules are created to schedule must-work servers if specified for a tour group.

Constraint (14) specifies that the shift variables $X_{knihtj}$, break variables $UB1_{kniht}$, $RB1_{kniht(j)}$, $UB3_{kniht}$, $RB3_{kniht(j)}$ and work pattern variables $Q_{kl}$ can take only non-negative integer values, and shortage $S_t$ and excess $E_t$ variables can only take non-negative values.

The example of an MIP model shown in inequalities 5-14 is applicable to scheduling one or more universal servers or servers in a non-skills based environment. In such an embodiment, staffing requirements are determined for servers over the scheduling period. The example MIP model shown in inequalities 5-14 is modified by the MIP Model Generator 102 if there are two or more skill groups with distinct skill sets $S_u$, as would be present in a skills-based environment.

In the skills based environment, the example of the MIP Model Generator 102 uses modified variables, parameters, objective function and constraints to schedule servers from different skill groups together. For example, it uses the following constraints in place of constraint (6):

$$\Sigma_{u \in G} e^{ur} \theta^{ur}_t + S^r_t - E^r_t = b^r_t, r \in SK, t \in \Omega,$$  (15)

$$SA^u_t(X, UB1, RB1, UB3, RB3) - \Sigma_{l \in S_u} \theta^{ul}_t = 0, u \in G, t \in \Omega,$$  (16)

$SA^u_t(X, UB1, RB1, UB3, RB3)$
$= \Sigma_{k \in Tu} \Sigma_{n \in STku} \Sigma_h \Sigma_{i \in DSknhu} \varepsilon_{j \in BW2knihu} a_{knihtu} X^u_{knihj} - \Sigma_{k \in Tu}$
$\Sigma_{n \in STku} \Sigma_h \Sigma_{i \in UT1knhtu} UB^u 1_{kniht} -$
$\Sigma_{k \in Tu} \Sigma_{n \in STku} \Sigma_h \Sigma_{j \in BW2knihu} \varepsilon_{i \in RT1knht(j)u} RB1^u_{kniht}$
$(j) - \Sigma_{k \in Tu} \varepsilon_{n \in STku} \Sigma_h \Sigma_{i \in UT3knhtu} UB3^u_{kniht} -$
$\Sigma_{k \in Tu} \Sigma_{n \in STku} \Sigma_h \Sigma_{j \in BW2knihu} \Sigma_{i \in RT3knht(j)u}$
$RB3^u_{kniht(j)}, u \in S, t \in \Omega$  (17)

where
$\theta^{ur}_t$ is the number of servers from skill group u scheduled and not on a break in interval t allocated to service type r, $r \in SK$, $e^{ur}$ is the relative efficiency of a server from skill group u in providing service type r, $e^{ur} \in [0, 1]$;

$X^u_{kniht}$ is the shift variable and represents number of servers from skill group u who are scheduled using tour group k and shift template n with the shift start time of interval i on day h and will start their second break in interval t, $a_{knihtu}$ is equal to one if interval t, $t \in \Omega$, is a work period for servers from skill group u who are scheduled using tour group k, shift template n, and have the shift start time of interval i on day h, and zero otherwise, $UT1_{knhtu}$ is the set of shift start times on day h for shift template n and tour group k for skill group u for which interval t, $t \in \Omega$, is an unrestricted first break start time, $RT1_{knht(j)u}$ is the set of shift start times on day h for shift template n and tour group k for skill group u for which interval t, $t \in \Omega$, is a restricted first break start time for the second break start time of j, $j \in BW2_{knih}$, $UT3_{knhtu}$ is the set of shift start times on day h for shift template n and tour group k for skill group u for which interval t, $t \in \Omega$, is an unrestricted third break start time, $RT3_{knht(j)u}$ is the set of shift start times on day h for shift template n and tour group k for skill group u for which interval t, $t \in \Omega$, is a restricted third break start time for the second break start time of j, $j \in BW2_{knih}$, $UB1^u_{kniht}$ is the unrestricted first break variable and represents the number of servers from skill group u who are scheduled using tour group k, shift template n with a start time of i on day h and taking their first break at unrestricted break time t, $t \in UBW1_{knih}$, and $RB1^u_{kniht(j)}$ is the restricted first break variable and represents the number of servers from skill group u who are scheduled using tour group k, shift template n with a start time of i on day h and taking their first break at restricted break time t, $t \in RBW1_{knih(j)}$, $j \in BW2_{knih}$.

$UB3^u_{kniht}$ is the unrestricted third break variable and represents the number of servers from skill group u who are scheduled using tour group k, shift template n with a start time of i on day h and taking their third break at unrestricted break time t, $t \in UBW3_{knih}$, and $RB3^u_{kniht(j)}$ is the restricted third break variable and represents the number of servers from skill group u who are scheduled using tour group k, shift template n with a start time of i on day h and taking their third break at restricted break time t, $t \in RBW3_{knih(j)}$, $j \in BW2_{knih}$.

$BW2_{knihu}$ is the set of break start times in the break window for the second break for servers from skill group u who are scheduled using tour group k, shift template n, and have the shift start time of interval i on day h, $T_u$ is the set of tour groups assigned to at least one server in skill group u, $ST_{ku}$ is the set of shift templates assigned to tour group k in $T_u$ for skill group u, $DS_{knhu}$ is the set of shift start times for tour group k for skill group u using shift template n, $n \in ST_{ku}$, on day h.

$b_t$ is the staffing requirement for service type r in interval t, $S^r_t$ is the number of servers by which the servers scheduled and not on a break is less than the staffing requirement for service type r, $r \in SK$, in interval t, $E^r_t$ is the number of servers by which the servers scheduled and not on a break is greater than the staffing requirement for service type r, $r \in SK$, in planning period t.

X is the set of shift variables $X^u_{kniht}$ for all $u \in G$, $k \in T_u$ $n \in ST_{ku}$ h=1, . . . , 7, $i \in DS_{knhu}$, $t \in BW2_{knihu}$.

UB1, RB1, UB3, and RB3 are defined similar to X to include, respectively, the first unrestricted, first restricted, third unrestricted, and third restricted break variables, For example, UB1 includes all unrestricted first break variables $UB1^u_{kniht}$, RB1 includes all restricted first break variables $RB1^u_{kniht(j)}$, for $k \in T_u$ $n \in ST_{ku}$ h=1, . . . , 7, $i \in DS_{knhu}$, $j \in BW2_{knihu}$, $u \in G$.

It should be clear to a person with ordinary skills in the art that some of the shift templates may be common to some or all skill groups or tour groups. In these examples, some of the variables and constraints associated with such shift templates may be defined for all such skill groups or tour groups.

The example of the IP Model Generator 102 uses the following objective function in place of (5) in the skills based environment:

$$\text{Minimize} \Sigma_{u \in G} \Sigma_{k \in T} \Sigma_{l \in Lk} C^u_{kl} Q^u_{kl} +$$
$$\Sigma_{u \in G} \Sigma_{k \in T} \Sigma_{n \in ST_{ku}} \Sigma_h \Sigma_{i \in DS_{knhu}} \Sigma_{t \in BW2_{knihu}} c^u_{knih} X^u_{kniht} + \Sigma_{r \in SK}$$
$$\Sigma_{t \in \Omega} P^r_t S^r_t \qquad (18)$$

where $C^u_{kl}$ is the weekly cost of scheduling a server from skill group u using tour k and work pattern l, $c^u_{knih}$ is the daily cost of a server from skill group u scheduled using tour group k and shift template n with shift start time of interval i on day h, $Q^u_{kl}$ is the work pattern variable and represents the number of servers from skill group u who are scheduled using tour group k and work pattern l, $P^r_t$ is a large positive penalty cost for having staffing shortage with skill r in interval t.

The example of the IP Model Generator 102 uses the following constraints in place of (7-10) to assure one first and one third break, if specified by the tour group, are scheduled for every server scheduled in the skills based environment:

$$\Sigma_{t \in RBW1knih(j)u} RB1^u_{kniht(j)} \leq X^u_{knihj}, u \in G, k \in T_u, n \in ST_{ku},$$
$$i \in DS_{knhu}, h=1, \ldots, 7, j \in BW2_{knihu}, \qquad (19)$$

$$\Sigma_{t \in UBW1knihu} UB^u_{kniht} + \Sigma_{j \in BW2knihu} \Sigma_{t \in RBW1knih(j)}$$
$$u RB1^u_{kniht(j)} = \Sigma_{j \in BW2knihu} X^u_{knihj}, u \in G, k \in T_u, n \in ST_{ku},$$
$$i \in DS_{knhu}, h=1, \ldots, 7, \qquad (20)$$

$$\Sigma_{t \in RBW3knih(j)u} RB3^u_{kniht(j)} \leq X^u_{knihj}, u \in G, k \in T_u, n \in ST_{ku},$$
$$i \in DS_{knhu}, h=1, \ldots, 7, j \in BW2_{knihu}, \qquad (21)$$

$$\Sigma_{t \in UBW3knihu} UB3^u_{kniht} + \Sigma_{j \in BW2knih} \Sigma_{t \in RBW3knih(j)}$$
$$u RB3^u_{kniht(j)} = \Sigma_{j \in BW2knihu} X^u_{knihj}, u \in G, k \in T, n \in ST_k,$$
$$i \in DS_{knh}, h=1, \ldots, 7, \qquad (22)$$

The example of the IP Model Generator 102 uses the following constraints in place of (11-14) in the skills based environment:

$$\Sigma_{l \in Lku} A_{klhu} Q^u_{kl} = \Sigma_{n \in STku} \Sigma_{i \in DSkhu} \Sigma_{j \in BW2knihu} X^u_{knihj} u \in G,$$
$$k \in T, h=1, \ldots, 7, \qquad (23)$$

$$\Sigma_{l \in Lku} Q^u_{kl} \leq D^{u,max}_k, u \in G, k \in T_u, \qquad (24)$$

$$\Sigma_{l \in Lku} Q^u_{kl} \geq D^{u,min}_k, u \in G, k \in T_u, \qquad (25)$$

$X^u_{knihj}, Q^u_{kl}, UB1^u_{kniht}, RB1^u_{kniht(j)}, UB3^u_{kniht}, RB3^u_{kniht}$
$(j) \geq 0$ and integer, and $S^r_t$, and $E^r_t \geq 0$ for all $k \in T_u$,
$n \in ST_{ku}, i \in DS_{knhu}, l \in L_{ku}, t \in \Omega, j \in BW2_{knihu}$ and h=
1, . . . , 7. (26)

The IP Model Solver 103 applies a solution algorithm to find an optimal or near optimal solution to the MIP model of the invention, as shown in step 516 in FIG. 5A. In some examples, the solution algorithm may be the branch and bound ("B&B") algorithm (Wolsey, 1998) for integer programming models available in the open source and commercially available optimization libraries. For example, libraries such as ILOG® CPLEX® offered by IBM, FICO® Xpress by FICO, Inc., and open source software such as lpsolve and COIN-OR provide the B&B algorithm. The B&B algorithm may be supplemented by a search heuristics or cutting-planes (Wolsey, 1998) provided by these optimization libraries or the MIP Model Solver 103. In other examples, both the B&B, heuristic and cutting-planes may be implemented in the MIP Model Solver 103 independent of any optimization library using a computer programming language such as C++ or C#, or using the said libraries. Other examples of the MIP model of the invention may be solved by a heuristic without the B&B algorithm.

Figure 5B:
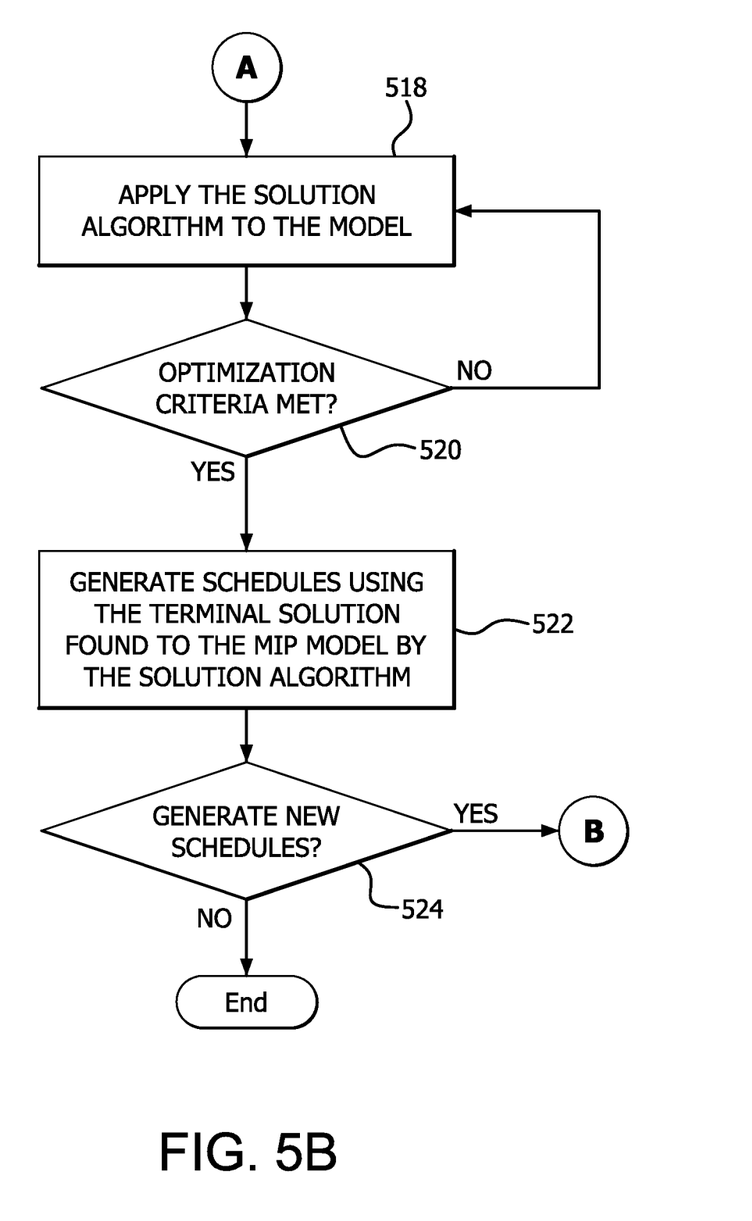

After locating a feasible solution to the MIP model, the MIP Model Solver 103 attempts to improve it by continuing the search, as shown in steps 518 and 520 in FIG. 5B. For example, if the MIP Model Solver is using the B&B algorithm, it will continue solving sub-problems at branches (Wolsey, 1998) to search for feasible solutions with a lower objective function value (5) or (18) than the best known solution. It may also apply heuristics at each sub-problem. The MIP Model Solver 103 stops when one or more stopping criteria is met with the best known feasible solution or terminal solution. Stopping criteria may include reaching a time limit by the MIP Model Solver 103 after locating the first feasible solution, finding a feasible solution with an objective value within a certain percent gap from a known lower bound, or upon reaching a limit on the number of branches in the B&B tree.

Once a terminal solution is found in the MIP Model Solver 103, detailed server schedules with work and off days, daily shift start and end times, and, if specified in the shift template used, daily first, second and third break times are generated in the schedule detail generator 104 according to the values of the variables in the terminal solution. This is shown in step 522 in FIG. 5B.

The detailed server schedules generated in the schedule detail generator 104 are stored in a database 105, one or more computers or other storage media. If desired, another set of schedules for a different scheduling period or server group may be started at step 524 in FIG. 5B.

The MIP model described herein therefore provides a scheduling system that is capable of optimizing server schedules based on a variety of criteria, while accounting for these criteria utilizing a reduced number of variables. Limiting the number of variables that must be taken into account significantly increases the practicality of finding optimized solutions to the models. The system simplifies the computational requirements, makes better use of available memory and processor capability, and provides more effectively optimized server scheduling. Such optimized scheduling not only ensures that customer needs are met in an effective and timely manner, but also ensures that access servers are not scheduled, thereby maximizing the value delivered at minimized cost.

Compared to the models described in U.S. Pat. No. 7,725,339, the above-described example of an MIP model provides for streamlined solution procedures for a wider variety of constraints. This advantage is obtained in part through the definition of the shift variable $X_{knihj}$ or $X_{knihj'}$, which combines break times for one or more specified breaks with shift variables. Expressed differently, a separate shift variable is defined for every combination of a tour group, shift template, day of week, shift start time, and the time for one break defined within the shift variable. Thus, scheduling one break per scheduled server requirement is implicitly met. Therefore, unlike the models described in U.S. Pat. No. 7,725,339, no variables or constraints for the second break times are included in the MIP model of the invention, thus reducing the number of variables and constraints defined. Expressed differently, fewer variables and constraints are defined for shift and one or more break scheduling for every tour k, shift template n, start time i on day h. This reduction in the number of variables and constraints simplifies the model construction as well as reducing the processing time required to calculate optimized solutions. Furthermore, unlike the prior art, the above-described example of an MIP model includes the work before constraints within the MIP model, using explicit constraints using break variables.

Given the particularly large number of variables and inequalities typically managed using MIP models, there is a definite cost in time and resources when entering the necessary data into a database, as well as when obtaining and utilizing computer processing resources to find optimal solutions to the MIP model. The advances described above therefore make using an MIP model for scheduling more feasible and practical for a wider variety of organizations.

A variety of modifications to the above-described embodiments will be apparent to those skilled in the art from this disclosure. For example, every MIP model described in U.S. Pat. No. 7,725,339 can be modified by combining break variables for one or more breaks with shift variables as in the MIP model of the invention. Thus, the invention may be embodied in other specific forms without departing from the spirit or essential attributes thereof. In another example, not only shift variables may be defined with one or more break start times as in the MIP models (5-14) and (15-26), said shift variable and shift start times on work days may also be combined with the work pattern variables $Q_{kl}$ and $Q''_{kl}$ to reduce the number of variables and constraints further. The particular embodiments disclosed are meant to be illustrative only and not limiting as to the scope of the invention. The appended claims, rather than to the foregoing specification, should be referenced to indicate the scope of the invention.

What is claimed is:

1. A computer-implemented method for scheduling servers, the method comprising:
    acquiring a scheduling period, the scheduling period being divided into a plurality of sub-periods, each sub-period having staffing requirements;
    acquiring tour group information for a plurality of servers, the tour group information including a shift template, the shift template including at least one break start time, the shift template further including a shift start time, a shift duration, a break window, a break start time, a break duration, and work before rules for breaks, the shift start time, break window, and break start time beginning at a beginning of a sub period, the work before rules for breaks defining a number of sub-periods of work between breaks;
    acquiring criteria to be optimized by the system; and
    generating a mixed integer programming model, the mixed integer programming model including at least one shift variable, the at least one shift variable being defined to include a start time for one break within the at least one shift variable.

2. The computer-implemented method according to claim 1, further comprising:
    acquiring a solution algorithm;
    applying the solution algorithm to the mixed integer programming model; and
    generating a schedule, the schedule including at least one of work days, off days, shift start times, shift end times, break start times, break durations, and break end times for each server.

3. The computer-implemented method according to claim 1, further comprising acquiring server information about each server, the server information including one or more of a skill group to which each server is assigned, and a location of each server.

4. The computer-implemented method according to claim 1, wherein each shift variable is defined for one combination of a tour group, shift template, and a start time for at least one break defined within the shift variable.

5. The computer-implemented method according to claim 4, wherein each shift variable is defined to include a day of week and shift start time.

6. The computer-implemented method according to claim 1, further comprising:
creating an unrestricted break variable for every break specified by the shift template and not included in the at least one shift variable for which every possible break start time does not violate work before rules;
creating a restricted break variable for every break specified by the shift template and not included in the at least one shift variable for which at least one possible break start time violates work before rules; and
creating constraints to require that a sufficient number of restricted and unrestricted break times are scheduled without violating work before rules.

7. The computer-implemented method according to claim 1, wherein the tour group includes work days and off days.

8. A system for scheduling servers, the system comprising:
a database, the database having memory containing:
a scheduling period, the scheduling period being divided into a plurality of sub-periods, each sub-period having staffing requirements;
tour group information for a plurality of servers, the tour group information including a shift template, the shift template including at least one break start time, the shift template further including a shift start time, a shift duration, a break window, a break start time, a break duration, and work before rules for breaks, the shift start time, break window, and break start time beginning at a beginning of a sub period, the work before rules for breaks defining a number of sub-periods of work between breaks;
criteria to be optimized by the system; and
a mixed integer programming model generator, the mixed integer programming model generator having memory containing executable instructions for generating a mixed integer programming model, the mixed integer programming model including at least one shift variable, the at least one shift variable being defined to include a start time for one break within the at least one shift variable.

9. The system according to claim 8, further comprising:
a mixed integer programming model solver, the mixed integer programming model solver having memory containing executable instructions for acquiring a solution algorithm, and for applying the solution algorithm to the mixed integer programming model until one or more stopping criteria is met and stopping with a terminal solution to the mixed integer programming model; and
a schedule detail generator, the schedule detail generator having memory containing executable instructions for utilizing the terminal solution of the mixed integer programming model to create a schedule, the schedule including at least one of work days, off days, shift start times, shift durations, shift end times, break start times, and break durations for each server.

10. The system according to claim 8, wherein the database further includes server information about each server, the server information including one or more of a skill group to which the server belongs, skills possessed by servers within the skill group, a location of a server, and a tour group for each server.

11. The system according to claim 8, wherein the executable instructions within the mixed integer programming model generator define each shift variable for one combination of a tour group, shift template, and the start time for one break defined within the shift variable.

12. The system according to claim 11, wherein each shift variable is defined to include a day of week and shift start time.

13. The system according to claim 8, wherein the executable instructions within the mixed integer programming model generator further comprise:
creating an unrestricted break variable for every break specified by the shift template and not included in the at least one shift variable for which every possible break start time does not violate work before rules;
creating a restricted break variable for every break specified by the shift template and not included in the at least one shift variable for which at least one possible break start time violates work before rules; and
creating a constraint to require that a sufficient number of restricted and unrestricted break times are scheduled without violating work before rules.

14. The system according to claim 8, wherein the tour group includes work days and off days.

* * * * *